United States Patent

Kruse et al.

[11] 4,113,429
[45] Sep. 12, 1978

[54] PREPARATION OF A DISPERSE DYESTUFF CONTAINING A PHOSPHORIC ACID ESTER, HAVING IMPROVED SAFETY PROPERTIES AND HIGHER DYESTUFF YIELD WHEN DYED ON SYNTHETIC MATERIALS

[75] Inventors: Hubert Kruse, Kelkheim, Taunus; Konrad Opitz, Liederbach, Taunus, both of Fed. Rep. of Germany

[73] Assignee: Hoechst Aktiengesellschaft, Frankfurt am Main, Fed. Rep. of Germany

[21] Appl. No.: 690,023

[22] Filed: May 26, 1976

[30] Foreign Application Priority Data

May 28, 1975 [DE] Fed. Rep. of Germany ....... 2523659

[51] Int. Cl.² .......................... D06P 1/16; D06P 1/18; D06P 1/20; D06P 3/36
[52] U.S. Cl. .............................. 8/90; 8/34; 8/39 C; 8/41 C; 8/162 R; 8/179
[58] Field of Search ........... 260/204, 207, 282, 289 R; 8/90; 106/288 Q, 308 Q

[56] References Cited

U.S. PATENT DOCUMENTS

| | | | |
|---|---|---|---|
| 3,416,877 | 12/1968 | Gantz et al. | 8/55 |
| 3,433,574 | 3/1969 | Dursch et al. | 8/89 |
| 3,860,392 | 1/1975 | Renault et al. | 8/169 |
| 3,965,147 | 6/1976 | Hendricks | 8/90 X |

FOREIGN PATENT DOCUMENTS

| | | | |
|---|---|---|---|
| 2,319,236 | 10/1974 | Fed. Rep. of Germany | 8/90 |
| 2,348,518 | 4/1975 | Fed. Rep. of Germany | 8/90 |
| 2,020,295 | 11/1970 | Fed. Rep. of Germany | 8/90 |
| 1,075,551 | 2/1960 | Fed. Rep. of Germany | 8/89 |
| 304,363 | 1/1955 | Switzerland | 260/166 |

*Primary Examiner*—Floyd D. Higel
*Attorney, Agent, or Firm*—Curtis, Morris & Safford

[57] ABSTRACT

Solid or aqueous liquid preparations of dispersed dyestuffs of improved safety properties and/or of a higher dyestuff yield when applied to the pad-dyeing process of synthetic or semi-synthetic fibrous materials containing beside usual disperse dyestuffs, dispersing agents, wetting agents, grinding auxiliary agents, 0.5 to 30, preferably 1 to 10 per cent by weight of at least one phosphoric acid ester of the formula

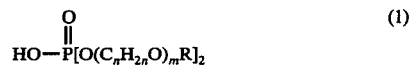

(1)

or

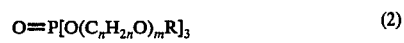

(2)

in which n represents the integer 2 or 3, m represents an integer from 0 to 10, and R represents alkyl of 8 to 20 carbon atoms, or of mixtures of phosphoric acid esters of the said formulae (1) and (2).

1 Claim, No Drawings

PREPARATION OF A DISPERSE DYESTUFF CONTAINING A PHOSPHORIC ACID ESTER, HAVING IMPROVED SAFETY PROPERTIES AND HIGHER DYESTUFF YIELD WHEN DYED ON SYNTHETIC MATERIALS

This invention relates to preparations of disperse dyestuffs having improved safety properties and/or higher dyestuff yields.

The disperse dyestuffs used for the dyeing and printing of synthetic fibers, especially those made of polyesters, for example polyethylene terephthalate, are commercialized as powders or liquids in finely dispersed form.

The powders or liquids of the dyestuffs insoluble or only sparingly soluble in water are prepared in such a way that the dyestuff is mixed after synthesis in the form of the water-containing press cake or the dried powder with water-soluble dispersing agents and auxiliaries and ground to reach the degree of fine dispersion required with mechanical energy in a wet grinding device, such as ball mills, vibratory mills, bead mills, sand mills or corundum disk mills. The liquid preparations are then brought to the color intensity desired with water and, optionally, other auxiliaries, for example antifreezes. The aqueous grinding material rather has to be dried for the preparation of a dyestuff powder in a drying process, for example by means of spray dryers or fluidized bed dryers to obtain its powder form, its color intensity desired being obtained by means of diluents.

While the aqueous liquid preparations meet the safety requirements, certain safety values in respect of the dyestuff powders, which are in dust form, have to be considered, such as inflammability, self-ignition, exothermal decomposition, impact sensitivity and dust explosion. Since these requirements have to be met not only by the finished commercial goods, but also and especially by the dry intermediate stages during the preparation, for example in drying processes at elevated temperature, the dyestuff preparations, if required, should be pretreated in the aqueous medium such that they can be handled without any risk and meet the safety requirements.

The present invention provides preparations of disperse dyestuffs having improved safety properties and/or giving a higher dyestuff yield in the pad dyeing of synthetic and semi-synthetic fibrous materials, these preparations containing 5-60% by weight of one or several disperse dyestuffs insoluble or sparingly soluble in water, 5-90% by weight of a dispersing agent, 0-90% by weight of a wetting agent, 0-60% by weight of a grinding auxiliary, 0-90% by weight of water and 0.5-30% by weight, preferably 1-10% by weight of at least one phosphoric acid ester of the general formula (1) or (2)

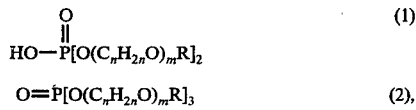

$$HO-P[O(C_nH_{2n}O)_mR]_2 \quad (1)$$

$$O=P[O(C_nH_{2n}O)_mR]_3 \quad (2),$$

wherein $n$ is 2 or 3, $m$ is 0 to 10 and R is an alkyl radical of 8-20 carbon atoms or of mixtures of phosphoric acid esters of the said formulae (1) and (2).

Dyestuffs insoluble in water or only sparingly soluble in water are, for example azo, anthraquinone, nitro, methine, quinophthalone, thioxanthene, diphenylamine, styryl, azostyryl, naphthoperinone or naphthoquinonimine dyestuffs, which do not contain water-solubilizing groups in the molecule.

The preparations of disperse dyestuffs may contain as dispersing or wetting agents, which may also serve as diluants, various products, especially anionactive compounds, for example naphthalene sulfonic acids, alykylated naphthalene sulfonic acids, condensation products of naphthalene or naphthol sulfonic acids or phenols with formaldehyde, polyvinyl sulfonates and lignin sulfonic acids, each in the form of alkali metal salts, fatty acids, resinic acids, gallic acids, sulfated primary aliphatic alcohols of 10-18 carbon atoms, sulfated unsaturated fatty acids, fatty acid ethers, fatty acid amides, sulfated alkylene oxide adducts; sulfated partially esterified polyvalent alcohols, alkylsulfonates, alkylarylsulfonates, alkylnaphthalene sulfonates, sulfonates of polycarboxylic acid esters and -amides and condensation products of fatty acids with aminoalkyl sulfonates, as well as suitable mixtures of the aforementioned compounds.

The amount of dispersing and wetting agents in the preparations of disperse dyestuffs is within the range of from 5 to 90% by weight, calculated on the powdered preparation, or from 5 to 50% by weight, calculated on the liquid preparation. Provided that the dispersing agents added also act sufficiently as wetting agents, there is no need to add wetting agents separately.

Grinding auxiliaries or further diluants are for example protective colloids, hygroscopic substances, starch, dextrins, caseins, alginates, gelatins, carboxymethyl cellulose, polyvinyl pyrrolidon or polyacrylates. Grinding auxiliaries do not have to be added in all cases, and therefore, they are used in amounts of from 0 to 60% by weight, calculated on the material preparation.

In the manufacture of the preparations according to the invention, the organic phosphoric acid esters mentioned may be added before, during or after the grinding process and before the drying process, for example spray drying or fluidized bed drying, to the aqueous grinding paste of disperse dyestuffs, the safety properties of the dyestuff powders prepared therefrom being considerably improved. Moreover, the preparations of dyestuffs in powder form obtained according to the invention which contain the organic phosphoric acid esters, are distinguished by a reduced tendency to dusting and often by a higher dyestuff yield in the pad dyeing of synthetic or semi-synthetic fibrous materials.

The liquid preparations of disperse dyestuffs to which the said organic phosphoric acid esters are added before, during or after grinding in the preparation process, also show like the powders prepared according to the invention a clearly improved dyestuff yield in pad dyeings on the fibrous materials mentioned.

Furthermore, the organic phosphoric acid esters added to the ground disperse dyestuffs have a desired defoaming effect on the grinding paste.

The safety properties of the disperse dyestuff powders indicated in the following Examples have been examined according to the usual methods in comparison with products not having these additives: dust explosion (danger class 0: not dangerous, danger class 2: very dangerous) and exothermal decomposition according to Geigy-Kuhner, self-ignition according to Gliwitzky, impact sensitivity according to BAM-Brauschweig, inflammability with platinum wire (1000° C) and lighting gas flame.

The dust values indicated in the following Examples have been measured by means of a dust measuring apparatus "System Cassella".

In this test, 30 g of dyestuff powder are dropped from a store funnel through a drop pipe in 50 cm height in a measuring box where the change in percentage of the light intensity between the light source within the measuring box and a photocell produced by whirling-up dyestuff dust is measured by means of an indicating galvanometer. The dust value so evaluated may vary within 0 (no dust) and 200.

To carry out the pad dyeings, pre-fixed polyester staple fiber fabrics have been impregnated with an aqueous dyeing liquor containing disperse dyestuff and dyeing auxiliary, squeezed off over a two-roller padding machine thermosoled at 200° C during 60 seconds after pre-drying, purified afterwords while wet and dried by means of a calender. The color intensity was evulated by a comparative test of the fabrics dyed.

The preparations of disperse dyestuffs according to the invention examined according to the test and measuring methods mentioned above showed the following properties:

1. Improved safety properties of the dyestuff powders prepared, which made it possible to handle the powder preparations without risk and to dry them according to the methods usual in industry, for example spray drying or fluidized bed drying.

2. A reduced tendency to dusting of the dyestuff powders prepared, which made the addition of further dedusting agents, for example mineral oils, often perturbing the dyeing process, completely or partially unnecessary.

3. An improved dyestuff yield in the pad-dyeing observed with the dyestuff powders prepared as well as with the corresponding liquid preparations.

4. Furthermore, the addition of organic phosphoric acid esters to the ground disperse dyestuffs improved the grinding effect caused by the defoaming effect on the grinding paste.

The following Examples illustrate the invention, the parts and precentage being by weight unless stated otherwise:

EXAMPLE 1

100 Parts of the disperse dyestuff of the formula

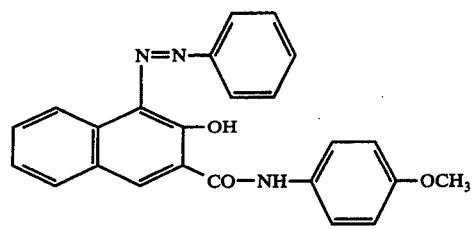

were ground in a stirrer mill to obtain the desired fine dispersion after the addition of water, 120 parts of a dispersing agent (condensation product of cresol, the sodium salt of the 2-naphthol-6-sulfonic acid, formaldehyde and sodium sulfite) and 20 parts of the tertiary organic phosphoric acid ester of the lauryl alcohol 2 AeO, spray-dried over a spray diffuser in the hot air stream (inlet temperature 150°–160° C, outlet temperature 70°–80° C), adjusted to 40% dyestuff using a condensation product of naphthalene sulfonic acid with formaldehyde and tested for safety characteristics, dust values and dyeing properties.

Compared to a powder prepared in the same manner but without containing the phosphoric acid ester, the powder according to the invention containing about 8.5% of phosphoric acid ester is distinguished by a self-ignition temperature raised from 140°–170° C, a reduced capability of dust explosion (danger class without additive: 2, with additive: 1 ), a reduced tendency to dusting (dust value without additive: 85, with additive: 55) and a dyestuff yield improved by about 40% in the pad-dyeing.

EXAMPLES 2–6

When the tertiary phosphoric acid ester of the lauryl alcohol . 2 AeO used is replaced by the same amount of other secondary or teritary phosphoric acid esters (as shown in the following Table), the comparative test of the safety properties, the dust values and the dyestuff yields in pad-dyeings as compared to the corresponding powder preparations without containing phosphoric acid esters gave the following values:

| Ex. | Addition of | Self-ignition temp. (0° C) | Dust explosion danger class | Dust value | | Dyestuff yield |
|---|---|---|---|---|---|---|
| 2 | sec. phosphoric acid ester of lauryl alcohol . 4 AeO | 180 | 0 | 21 | + | 50% |
| 3 | sec. phosphoric acid ester of oleyl aclohol . 8 AeO | 180 | 1 | 64 | + | 50% |
| 4 | tert. phosphoric acid ester of oleyl alcohol | 170 | 0 | 15 | + | 50% |
| 5 | tert. phosphoric acid ester of oleyl alcohol . 8 AeO | 170 | 0 | 59 | + | 50% |
| 6 | tert. phosphoric acid ester of a mixture of cetyl and stearyl alcohol (quantitative ratio 1:1) . 2 AeO | 170 | 0 | 29 | + | 40% |
| Comparison | without additive | 140 | 2 | 85 | | according to type |

EXAMPLE 7

100 Parts of the disperse dyestuff mixture of A and B (ratio 1:1) of the formulae

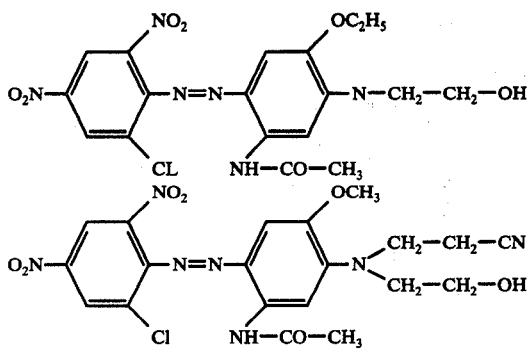

sulfite, 10 alcohol . 1
were ground in a stirrer mill to obtain the desired fine dispersion after the addition of water, 120 parts of dispersing agent (condensation product of cresol, formaldehyde and sodium sulfite), 10 parts of a wetting agent (the sodium salt of the diisobutylnaphthalene sulfonic acid) and 10 parts of the tertiary organic phosphoric acid ester of the lauryl alcohol. 2 AeO, spray-dried over a spray diffuser (as indicated in Example 1 ), adjusted to 32% of dyestuff using the wetting agent mentioned above and tested for the safety characteristics, the dust value and the dyeing properties.

In comparison to a powder prepared in the same manner but without containing the phosphoric acid ester, the powder containing about 3.2% of phosphoric acid ester according to the invention is distinguished by a self-ignition temperature raised from 140° to 160° C, an exothermal decomposition temperature raised from 140° to 170° C, a reduced dusting tendency (dust value without additive: 66, with additive: 37) and a dyestuff yield improved by 10% in the pad-dyeing.

EXAMPLE 8

100 Parts of the disperse dyestuff of the formula

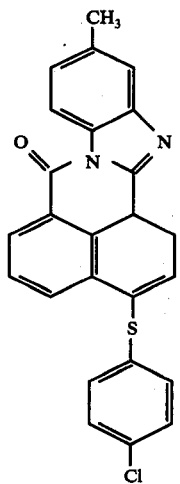

were ground in a stirrer mill to obtain the desired fine dispersion after the addition of water, 160 parts of a dispersing agent (condensation product of cresol, formaldehyde, and sodium sulfite), 80 parts of a wetting agent (sodium salt of the diisobutylnaphthalene-sulfonic acid) and 10 parts of the tertiary organic phosphoric acid ester of the lauryl alcohol . 2 AeO, spray-dried over a spray diffuser (as indicated in Example 1), adjusted to 20% dyestuff using the wetting agent mentioned above and tested for safety characteristics, dust value and dyeing properties.

In comparison to a powder prepared in the same manner but without containing the phosphoric acid ester, the powder containing about 2% of phosphoric acid ester prepared according to the invention is distinguished by a self-ignition temperature raised from 200° to 230° C and a considerably reduced tendency to dusting (dust value without additive: 108, with additive: 33),

EXAMPLE 9

100 Parts of the mixture of disperse dyestuffs A and B (ratio 2 : 3)

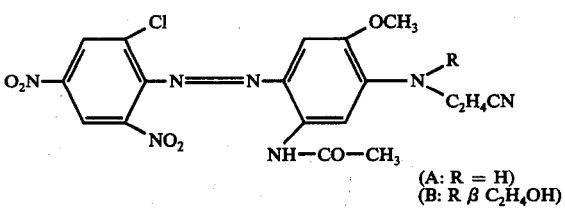

(A: R = H)
(B: R β $C_2H_4OH$)

were ground in a stirrer mill to obtain the desired fine distribution after the addition of water, 150 parts of a dispersing agent (condensation product of cresol, the sodium salt of the 2-naphthol-6-sulfonic acid, formaldehyde and sodium sulfite), 20 parts of an auxiliary agent (nitrilotriacetic acid sodium) and 20 parts of the tertiary organic phosphoric acid ester of laurylalcohol. 2 AeO, spray-dried over a spray diffuser (as indicated in Example 1), adjusted to 30% dyestuff with a mixture of the condensation product of naphthalene sulfonic acid with formaldehyde and the sodium salt of the diisobutyl-naphthalene sulfonic acid and tested for the safety dates, the dust value and the dyeing properties.

In comparision to a powder prepared in the same manner but without containing the phosphoric acid ester, the powder containing about 6% of phosphoric acid ester according to the invention is distinguished by an exothermal decomposition temperature raised from 130° to >310° C, a reduced dust explosion capacity, a reduced dusting tendency (dust value without additive: 18, with additive: 11 ) and a dyestuff yield improved by 20% in the pad-dyeing.

EXAMPLE 10

100 Parts of the disperse dyestuff indicated in Example 1 were ground after the addition of water, 80 parts of a dispersing agent (condensation product of cresol, the sodium salt of the 2-naphthol-6-sulfonic acid, formaldehyde and sodium sulfite), 2 parts of pentachlorophenol sodium as conserving agent and 20 parts of the tertiary organic phosphoric acid ester of lauryl alcohol . 2AeO in a stirrer mill to obtain the desired fine distribution and then adjusted to 20% dyestuff content with water.

In comparison to a liquid preparation prepared in the same manner but without containing the phosphoric acid ester the liquid preparation containing about 4% of phosphoric acid ester prepared according to the invention is distinguished by a dyestuff yield improved by about 10% in the pad-dyeing.

EXAMPLE 11

100 Parts of the disperse dyestuff indicated in Example 9 were ground in a stirrer mill to obtain the desired fine distribution after the addition of water, 100 parts of a dispersing agent (condensation product of cresol, formaldehyde and sodium sulfite), 2 parts of pentachlorophenol sodium as conserving agent and 10 parts of the tertiary organic phosphoric acid ester of lauryl alcohol . 2 AeO and then adjusted to 13% dyestuff content using water.

In comparison with a liquid preparation prepared in the same manner but without containing the phosphoric acid ester the liquid preparation containing about 1.3% of phosphoric acid ester prepared according to the invention is distinguished by a dyestuff yield improved by 10%.

EXAMPLE 12

100 Parts of the disperse dyestuff of the formula

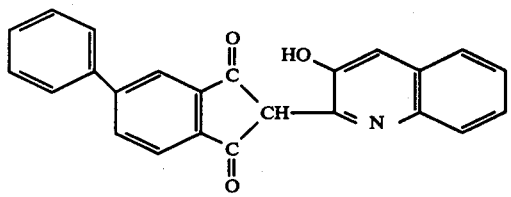

were ground in a stirrer mill to obtain the fine distribution desired after the addition of water, 70 parts of a dispersing agent (condensation product of cresol, the sodium salt of the 2-naphthol-6-sulfonic acid, formaldehyde and sodium sulfite), 2 parts of pentachlorophenol sodium as conserving agent and 10 parts of the tertiary organic phosphoric acid ester of lauryl alcohol . 2 AeO and then adjusted to a 20% dyestuff content using water.

In comparison with a liquid preparation prepared in the same manner but without containing the phosphoric acid ester, the liquid preparation containing about 2% of phosphoric acid ester prepared according to the invention is distinguished by a dyestuff yield improved by 30% in the pad-dyeing.

EXAMPLE 13 to 17

When in Example 12 the tertiary phosphoric acid ester of the lauryl alcohol . 2 AeO is replaced by the same amount of other tertiary or secondary phosphoric acid esters according to the following Table, the comparative test of the dyestuff yield in pad-dyeings compared to the corresponding liquid preparations without phosphoric acid ester showed the following improvements in the dyestuff yields:

| Examples | Addition of 2% of | Improvements in dyestuff yield |
|---|---|---|
| 13 | secondary phosphoric acid ester of lauryl alcohol . 4 AeO | +30% |
| 14 | secondary phosphoric acid ester of oleyl alcohol . 8 AeO | +30% |
| 15 | tertiary phosphoric acid ester of oleyl alcohol | +20% |
| 16 | tertiary phosphoric acid ester of oleyl alcohol . 8 AeO | +30% |
| 17 | tertiary phosphoric acid ester of a mixture of cetyl and stearyl alcohol (in the quantitative ratio 1:1) . 2 AeO | +30% |

We claim:
1. A dyestuff preparation consisting of
(1) 5 to 60 per cent by weight of a disperse dyestuff which is insoluble or sparingly soluble in water and which does not contain a water-solubilizing group,
(2) as a dispersing agent, 5 to 90 per cent by weight of a condensation product of a naphthalene sulfonic acid with formaldehyde, a condensation product of a naphtholsulfonic acid with formaldehyde, a condensation product of a phenol with formaldehyde, or a lignin sulfonic acid,
(3) as a wetting agent, 0 to 90 per cent by weight of an alkylated naphthalene sulfonic acid, a fatty acid, a resinic acid, a sulfated primary aliphatic alcohol of 10 to 18 carbon atoms, a sulfated unsaturated fatty acid, a fatty acid ether, a fatty acid amide, a sulfated alkylene oxide adduct, a sulfated partially esterified polyvalent alcohol, an alkylsulfonate, an alkylarylsulfonate, an alkylnaphthalene sulfonate, a sulfonate of a polycarboxylic acid ester, a sulfonate of a polycarboxylic acid amide or a condensation product of a fatty acid with an aminoalkylsulfonate,
(4) as a diluent or grinding auxiliary, 0 to 60 per cent by weight of a polyvinylsulfonate, gallic acid, a protective colloid, starch, dextrin, casein, an alginate, gelatin, carboxymethyl cellulose, polyvinyl pyrrolidone or polyacrylate, and
(5) 0.5 to 30 per cent by weight of a phosphoric ester of the formula

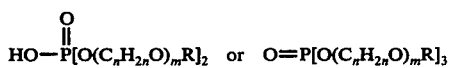

wherein $n$ is 2 or 3, $m$ is 0 to 10 and R is an alkyl radical of 8–20 carbon atoms.